Dec. 5, 1950          G. R. ELLIOTT          2,532,801
PRESSURE DIFFERENTIAL SERVOMOTOR AND CONTROL
Filed Oct. 3, 1945          3 Sheets-Sheet 1

INVENTOR.
GORDON R. ELLIOTT
BY
Robert A. Sloman
ATTORNEY

Patented Dec. 5, 1950

2,532,801

UNITED STATES PATENT OFFICE 2,532,801

PRESSURE DIFFERENTIAL SERVOMOTOR AND CONTROL

Gordon R. Elliott, Ferndale, Mich., assignor to Irving A. Puchner and Edward U. Demmer, Milwaukee, Wis.

Application October 3, 1945, Serial No. 619,947

8 Claims. (Cl. 121—38)

This invention relates to servo-motors per se of general utility of the type disclosed in applicant's pending applications Serial No. 508,033, filed Oct. 28, 1943, now Patent Number 2,440,654; Serial No. 573,997 filed January 22, 1945, now Patent Number 2,455,984; and Serial No. 593,723 filed May 14, 1945, now Patent Number 2,455,985, all three of which the present application is a continuation-in-part.

More particularly, the invention relates to a servo-motor having a chamber containing a movable member responsive to pressure differentials in said chamber on opposite sides thereof, with a power transmitting movable means joined to said movable member, together with a valve means for controlling said pressure differentials.

It is the object of this invention to provide a servo-motor consisting of a chamber, a diaphragm sealed therein and movable in response to a pressure differential on opposite sides thereof, a motion transmitting means joined at one end to said diaphragm, and a valve means for regulating said pressure differential.

It is the further object to provide a power chamber in conjunction with a hydraulic cylinder adapted to deliver fluid under pressure, together with a movable diaphragm in said chamber, a piston in said cylinder, means joined to said diaphragm adapted for effecting movement of said piston, and an air and vacuum control valve intermediate said chamber and cylinder for governing movement of said diaphragm.

These and other objects will be seen from the following specification, claims and drawings, in which preferable operative embodiments of the invention are illustrated. In the drawings:

It will be understood that the servo-motors in the drawings illustrate merely one operative use thereof by way of example, and that other embodiments and uses thereof are contemplated within the scope of the claims hereinafter set out.

Figures 1, 4:
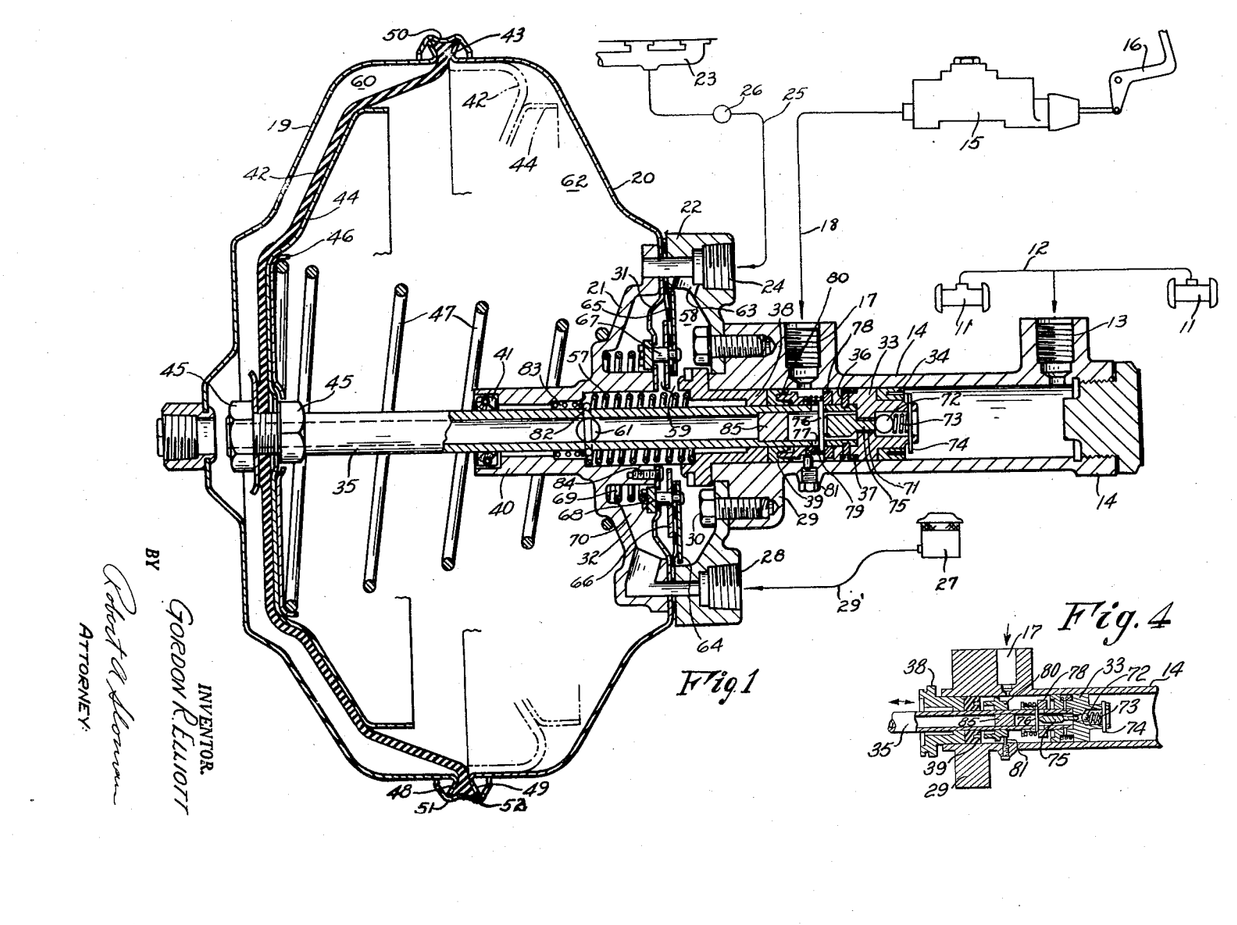
Fig. 1 is a side elevational section of a servomotor including a diagrammatic indication of a vehicle master cylinder, intake manifold, wheel brake cylinders, and conduits therefor.
Fig. 4 is an enlarged fragmentary section of the valve and hydraulic piston shown in Fig. 1.

In Fig. 1, the vehicle brake wheel cylinders 11 are joined by conduit 12 to outlet port 13 in the end of hydraulic cylinder 14. Master cylinder 15 with manually operable foot pedal actuated means 16 is joined to fluid intake port 17 of cylinder 14 by conduit 18.

The power chamber consisting of hollow circular opposing shell members 19 and 20 is joined to the left end of hydraulic cylinder 14 with the air and vacuum valve consisting of valve body members 21 and 22, interposed therebetween.

The vehicle intake manifold 23 provides a vacuum source to vacuum port 24 in valve 21—22 by interconnecting conduit 25 with check valve 26 interposed. On the other hand, air filter 27 is joined to the valve air intake port 28 by conduit 29'.

Valve body 22 is secured to member 29, forming an integral part of cylinder 14, by a plurality of circularly arranged studs 30, two of which are shown in the drawing. The complementary valve body 21 is likewise secured to valve body 22 by a plurality of similar circularly arranged bolts, not shown in the drawing, with the central end portion of shell 20 being interposed therebetween to provide a valve air seat plate 31 with air inlet openings 32.

Fluid control piston 33 with sealing cup 34 is movable within cylinder 14 being secured to one end of the hollow power rod 35 by the two pins 36 retained by coil spring 37. Hollow valve control piston 38 with sealing cup 39 is slidably provisioned within cylinder 14 in spaced relation to fluid control piston 33.

Power rod 35 slidably supported through valve piston 38 is also slidably journaled through the elongated hollow portion 40 forming a part of valve body 21, with a suitable seal 41 being provisioned within the end of member 40 between member 40 and said rod.

Concave annular flexible diaphragm 42 with outer annular sealing rib 43, reinforced by hollow annular plate 44 is secured centrally to the left end of hollow power rod 35 by threaded nuts 45 on opposite sides thereof. Circular spring retainer plate 46 registers with reinforcing plate 44, with coil spring 47 being interposed between plate 46 and valve body 21, to normally and resiliently retain diaphragm 42 in the inoperative position shown.

The opposing shell members 19 and 20 are respectively annularly flanged at 48 and 49 for encompassing the edges of annular rib 43 which forms a part of diaphragm 42. Annular concave broken clamp ring 50 is positioned over shaped flanges 48 and 49 the edges of said flanges resting in the bent portions 51 and 52 respectively of clamping ring 50.

Referring again to Fig. 1, coiled spring 51 is provisioned within valve body 21—22 with its left end engaging the valve housing and with its other end registering with valve control piston 38 to normally resist movement thereof to maintain, when inoperative, vacuum communication between vacuum chamber 58 and chamber 59. Vacuum communication is established with chamber 60 in shell 19 by means of openings 61 in hollow rod 35.

Vacuum is constantly maintained in chamber 62 within shell member 20 by means of passage 63 in valve body 21—22 which is joined by vacuum conduit 25. With vacuum communication established in both chambers 60 and 62 it is seen that there is an equilibrium of pressure on opposite sides of diaphragm 42. By the existence of spring 47 it is thus seen that when inoperative, the diaphragm and the power shaft assume the position shown in Fig. 1.

To obtain power braking, valve piston 38 is projected to the left on application of master cylinder 15. Piston 38 engages diaphragm plate 64 carried by flexible diaphragm 65 peripherally retained between valve body members 21 and 22. A secondary diaphragm plate 66 of reduced diameter is secured on the opposite side of diaphragm 65 by rivet 67 which extends through both plates and said diaphragm.

Rivets 67 extend outwardly through air openings 32 in air valve seat 31 and are secured at their ends to air valve disc 68, which is normally seated relative to air valve seat 31 by coiled spring 69.

Piston 38 when moved to the left contacts diaphragm plates 64 and 66 closing off vacuum communication between vacuum chamber 58 and chamber 59. Further movement to the left of piston 38 effects translation to the left of diaphragm 65 and corresponding unseating movement of air valve disc 68 permitting air in chamber 70 to pass through openings 32 in valve seat 31, and into chamber 59 which is in communication at all times with power chamber 60.

With air in chamber 60 and vacuum maintained in chamber 62, the pressure differential on opposite sides of diaphragm 42 effects translation thereof forcefully to the right carrying therewith power shaft 35 which is joined to brake operating piston 33 to obtain power braking.

Hydraulic piston 33 has a passage 71 therethrough adapted to be closed by ball valve 72 retained within piston 33 by spring 73 and pin 74. Ball valve operating member 75 adapted to unseat ball 72 and to permit its seating relative to piston passage 71, is adjustably retained within the end of hollow shaft 35 by transverse pin 76 within slot 77 formed therein.

Pin 76 also adjustably retains flanged sleeve member 78 relatively to shaft 35, the ends of pin 76 being held by coiled spring 79 provisioned between the end flanges of said sleeve. Ring 80 is interposed between sleeve 78 and sealing cup 39 and is maintained against the latter for movement therewith by the resilient action of spring 73.

Transverse stud 81 extending into cylinder 14 acts as a stop limiting movement of ring 80 to the right, and movements of sleeve 78 to the left.

Operation

On initial application of the vehicle foot pedal energizing master cylinder 15 and directing fluid under pressure through conduit 18, fluid enters the chamber between pistons 33 and 38 effecting movement to the left of valve piston 38 with some fluid passing through passage 71 in piston 33.

Ring 80 and sleeve 78 follow piston 38 to the left under action of ball spring 73, permitting movement to the left of pin 76 and valve member 75 retained thereby. Ball 72 is thus permitted to close passage 71 under expansive action of spring 73. Movement of sleeve 78 to the left ends when spring 73 becomes inoperative on ball 72 seating over opening 71 and piston 33; and a spaced relation now exists between said sleeve and piston 33.

Movement of piston 38 to the left has operated the air and vacuum control valve 21—22 and power rod 35 is projected to the right through piston 38 in the manner above described. Piston 33 with its passage 71 now closed, operatively acts upon the brake fluid within cylinder 14 directing the same at relatively high pressure to the vehicle brake wheel cylinders 11 through port 13.

Movement of power rod 35 to the right also effects movement of sleeve 78 which is loosely joined thereto by pin 76. However as rod 35 and piston 33 move as a unit sleeve member 78 merely floats along therewith but a spaced relation is still maintained between said sleeve and piston 33.

On brake release fluid pressure in the chamber between pistons 33 and 38 is reduced practically to zero permitting return movement of valve piston 38 to the right under action of spring 57 closing off the air to chamber 60 and again establishing vacuum communication thereto by return of diaphragm 65 to its initial position and air valve disc 68 to its seated position under action of spring 69.

Movement to the right of piston 38 is accompanied by a relative movement therethrough to the left of power shaft 35 under action of spring 47, and the relatively high fluid pressure in the hydraulic chamber of cylinder 14. Return of piston 33 joined to rod 35 is limited by engagement of sleeve 78 with stop pin 81. However it is to be noted that the pre-existing spaced relation between sleeve 78 and piston 33 permits movement of piston 33 relative to said sleeve, and pin 76 now retained by sleeve 78 prevents movement of ball unseating member 75 with the result that ball 72 is promptly unseated permitting a quick release of the fluid under pressure in the hydraulic chamber of cylinder 14.

Thus a prompt and quick brake release is obtained immediately upon release of the vehicle foot pedal operating pivotal member 16 which controls the master cylinder. Valve operating piston 38 returns to the right, piston 33 and 35 return to the left, and the ball valve 72 is simultaneously unseated releasing fluid pressure from the vehicle brake cylinders 11.

It will be noted that annular ring 82 secured upon power rod 35 is adapted to engage coil spring 83 which is housed within the extended portion 40 of valve body member 21, thereby providing a yielding seat for said power shaft.

It will be noted however that spring 83 effects a slight translation to the right of rod 35 and its piston 33, so that a spaced relation is again established between sleeve 78 and stop pin 81. Thus it is seen that on the next brake application sleeve 78 is free to move to the left as above described in detail.

As previously described return movement of piston 33 as well as means 35, 42 under action of spring 47, is limited by engagement of sleeve 78 with stop pin 81. However, it will be seen that large spring 47 is now fully expanded. At the same time smaller coil spring 93 has been fully compressed to the extent that there is a small movement to the right of shaft 35 after its brake release return movement.

It is this slight movement to the right of shaft 35 which reestablishes a spaced relation between stop pin 81 and sleeve 78. This initial spaced relation between members 81 and 78 is necessary because it provides a means of permitting seating of ball valve 72 prior to power movement of shaft 35. Consequently shaft 35 is immediately effective on actuating piston 33 as ball valve 72 has been seated over opening 71 prior to movement of power shaft 35. Thus any possible lag in brake application is eliminated.

On brake release means 33, 35 and 42 are returning to the left, and means 78 first contacts stop 81. However, as above described there is still a spaced relation between means 78 and piston 33. And it is the further movement of piston 33 towards the stopped means 78 which has the effect of unseating ball valve 72 for obtaining a very prompt brake release.

It will be understood that with the brakes applied, movement to the right of piston 33 has very little or no effect on the initial leftward movement of piston 38. This follows because even though the brake may be applied, the flow of pressure fluid from unit 15 does not entirely cease and additional fluid will flow into the chamber between pistons 38 and 33 to take up the increased volume of that chamber. This follows because any decrease in the fluid pressure in said chamber between pistons 38 and 33 is automatically taken up by the reaction pressure or "pedal feel" of the operator in making the master cylinder pedal fully effective.

Referring to the operation of diaphragm means 65 initially, and before brake application, a balanced vacuum condition exists on both sides thereof. However, as piston 38 moves to the left vacuum is cut off to the chamber to the left of said diaphragm. Further movement to the left of piston 38 unseats air disc 68 so that now there is air to the left of diaphragm 65 with vacuum to the right thereof in chamber 58.

This pressure differential acts on diaphragm 65 tending to move it to the right against the leftward movement of piston 38. Thus it is seen that the pressure differential on opposite sides of diaphragm 65 tends to resist brake application, and the extent of this resistance is proportional to the extent of the pressure differential. Consequently, on brake application a counterforce is created which tends to resist brake application, and which gives to the operator a certain "pedal feel" as the brakes are applied.

It will also be noted that the inner circular portion of air valve seat 31 is secured at a plurality of points around valve body member 21 by screws 84. It will further be noted that hollow power shaft 35 has a plug 85 at one end for closing off the opening in said shaft from the chamber between pistons 33 and 38.

Figure 2:
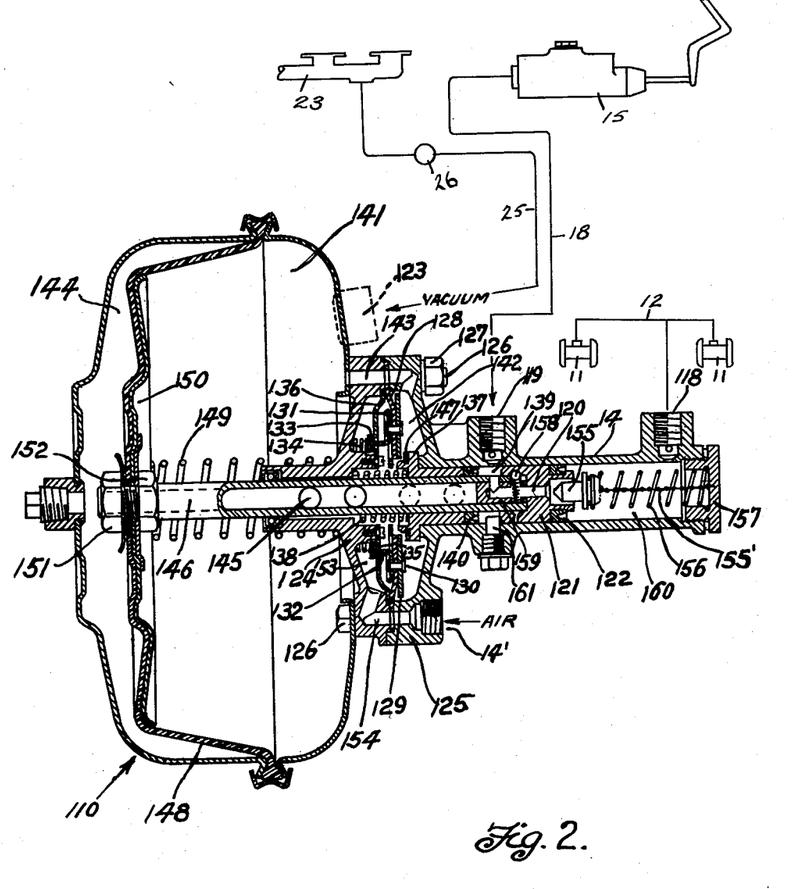
Fig. 2 is a different embodiment of the same.

Referring to Fig. 2 the vehicle brake hydraulic cylinder 14 has an outlet port 118 for communication with hydraulic brake lines 12 shown in Fig. 2.

In take port 119 connects with conduit 18 from the hydraulic master cylinder 15 whereby manually operated brake fluid is supplied under pressure to hydraulic cylinder 14 to be directed through the longitudinal opening 120 within piston 121 slidingly positioned in cylinder 14. Piston expansion cup 122 carried by piston 121 provides an effective hydraulic seal within cylinder 14.

Power chamber 110 is positioned at one side thereof with a vacuum inlet connection 123 adapted for connection to vacuum conduit 25 from the vehicle intake manifold 23 in the manner illustrated in Fig. 1.

The vacuum valve body housing 124 extending within power chamber housing 110 is suitably secured to the annular flange 125 of cylinder housing 14 by bolts 126 and nuts 127. It will be noted that said flanged portion 125 also forms a part of air and vacuum valve body 124. Power chamber 110 is likewise retained in fixed relation to valve body 124 by bolts 126 as shown in Fig. 2.

A hollow air control diaphragm 128 is peripherally retained between the annularly flanged members 124 and 125 which form the control valve body. Hollow diaphragm stiffening plate 129 is secured on one side of said diaphragm by rivets 130, the other ends of said rivets retaining air valve control disc 131 on the other side of said diaphragm.

Disc 131 is punched outwardly to form the annular flanged member 132 which is adapted to unseat air control disc 133, the latter being normally retained by spring 134 over annular air opening 135 in air valve seat 136. It will be noted that annular air valve seat 136 is peripherally secured between valve body flange 124 and diaphragm 128.

Hollow flanged valve control piston 137 is reciprocably and slidably positioned within the end of hydraulic cylinder 14 in engagement with spring 138, the other end of which is seated against the interior of valve body 124. Piston 137 is suitably sealed from control chamber 139 by the rubber expansion cup 140.

As shown in Fig. 2, vacuum communication established at connection 123 of the power chamber 110 constantly maintains a vacuum condition in chamber 141 as well as in chamber 142 joined thereto by passage 143 formed within valve body 124—125.

As shown in Fig. 2, vacuum is established in chamber 144 through openings 145 in hollow power rod 146. It will be noted that movement to the left of valve control piston 137 causes disc 147 thereon to sealingly engage plate 129 cutting off further vacuum communication to chamber 144.

Initially, with vacuum in chambers 141 and 144 power diaphragm 148 peripherally secured within power chamber 110, assumes the position shown, with return spring 149 being interposed between valve body 124 and diaphragm supporting plate 150. It will be noted that a suitable seal 148' is provided around rod 46 and within the end of valve housing 24 Fig. 2.

Said diaphragm and plate are centrally secured to hollow power rod 146 by the opposing nuts 151 and 152 threaded on said rod.

Referring to the control valve body 124 it is seen that air is at all times maintained in chamber 153 through air passage 154 formed within valve body members 124 and 125.

As valve control piston 137 moves to the left relatively to rod 146, in the manner hereafter described, it first engages diaphragm disc 129 for cutting off further vacuum communication between chamber 142 and chamber 144. Further movement to the left of piston 137 causes translation to the left of diaphragm 128 as well as the flanged member 132 for unseating spring retained disc 133 from its seat 136.

Air in chamber 153 is now able to flow through opening 135 in seat 136, through openings 145 in hollow rod 146 for communication with chamber 144 in power chamber housing 110. Air in chamber 144 and vacuum in chamber 141 disturbs the pre-existing equilibrium creating a substantial pressure differential on opposite sides of diaphragm 148, with the result that said diaphragm is projected forcefully to the right at the same time forcefully projecting power rod 146 centrally joined thereto. Movement to the right of rod 146 effects corresponding movement of hydraulic piston 121 in hydraulic cylinder 14 until opening 120 in piston 121 is closed by engagement of valve member 155 resiliently supported by coil spring 156, the outer end of which is adjustably secured by removable cover 157 threaded in the end of hydraulic cylinder 14.

It will be noted that rod 146 is secured at all times to piston 121 by means of the spring retained ball lock 158 so that piston 121 always moves with rod 146. Ball lock 158 may be manually disengaged from piston 121 in the event it is desired to separate said piston and rod for disassembly and, or cleaning. A plug 159 is tightly secured within hollow rod 146 with a suitable passage formed therein to coincide with and form a part of passage 120 in piston 121. Ball chain 155' interconnects valve 155 and cover 157 to limit movement of said valve.

Referring to Fig. 2, for conventional operation of the brakes the master cylinder 15 is operated by foot pedal 16 for directing fluid under pressure through conduit 18, into port 119 of the hydraulic cylinder, chamber 139 and through passage 120 into chamber 160 whence it is directed out connection 118 through conduits 12 to the brake cylinders 11 for the vehicle wheels respectively. This initial actuation of brake pedal 16 will result in a partial braking effect upon wheel drums and will also take up the slack of fluid in chamber 160 as well as in conduits 12.

As soon, however, as said slack is taken up it will be seen that continued and further actuation of brake pedal 16 will tend to compress fluid within chamber 139 as well as in chamber 160 with the result that valve control piston 137 is projected to the left. In the first instance, it will be seen that disc 147 carried by said piston will engage the diaphragm disc 129 for closing off further vacuum communication to chamber 144 forming a part of power chamber 110. It will be noted that momentarily there is a balanced condition between chambers 141 and 144 with vacuum in both chambers. However, further movement of control piston 137 to the left effects movement to the left of diaphragm 128 as well as the flanged member 132 which unseats spring retained air control disc 133.

Air which is constantly in chamber 153 is thus free to rush through opening 135 in valve seat 136 for communication with chamber 144 through hollow rod 146. Instantly there is a forceful translation of diaphragm 148 to the right due to the pressure differential between chambers 141 and 144 which is proportionate to the surface area of said diaphragm, and which results in forceful translation of power rod 146. Hydraulic piston 121 being joined thereto is also translated forcefully to the right, first sealing off passage 120 by engagement of valve member 155. Further movement of hydraulic piston 121 tends to exert a compressive force upon the fluid in chamber 160 with the result that a secondary power braking is effected through lines 12. It will be understood that as soon as passage 120 is closed off by engagement with valve member 155, fluid under pressure, which is maintained by continued application of brake pedal 16, is directed to chamber 139; and inasmuch as passage 120 is now closed, it will be seen that a degree of fluid pressure exists for cooperative action upon the end of piston 121 working in unison with the power rod 146 which is also effecting a pressure movement on piston 121 relative to the hydraulic fluid in chamber 160.

For example, while the initial braking pressure may be approximately 200 pounds per square inch, power chamber 110 effects a substantial multiplication of braking pressure so that approximately 800 to 1000 pounds per square inch pressure is available. It is understood that the above pressures are given merely by way of illustration and naturally would be varied depending upon the size of power chamber 110 and the surface area of diaphragm 148.

Movement of piston 121 to the right increasing the volume of chamber 139 partially reduces the existing fluid pressure therein permitting a partial return of valve piston 137 to the right under action of coiled spring 138. Diaphragm 128 and plate 129 under action of spring 134, follow valve piston 137 to the right, permitting air disc 133 to seat itself under action of said spring 134, cutting off further air communication between chambers 153 and 144. Said valve assembly is now in a balanced condition with further air and vacuum communication to chamber 144 effectively cut off.

Brake release is effected by relieving the manual pressure from master cylinder 15 with the result that the pressure in chamber 139 is reduced permitting control piston 137 to return to its initial position under action of coil spring 138. As soon as control piston 137 reaches the position shown in Fig. 2, vacuum communication is again established between chamber 141 and chamber 144, with the result that an equilibrium in pressure is established on opposite sides of diaphragm 148. Said diaphragm then returns to its initial position shown in Fig. 2, under action of coil spring 149. It will be noted that return of diaphragm 148 to its initial position also effects a corresponding return of power rod 146 as well as hydraulic piston 121 secured thereto.

A stop member 161 is threaded through hydraulic cylinder 14 and projects into chamber 139 to provide a limitation on the return movement of piston 121 as well as power rod 146 and diaphragm 148 secured thereto. The return of piston 121 to its initial position results in the unseating of valve member 155 again opening passage 120 in said piston which communicates with chamber 139. Thus all operating members are again in their initial positions ready for the next actuation of the brakes.

It will be understood that in the event of a failure of the power braking system or the air and vacuum control valve therein, manual application of the brakes is still available as above described.

After application of the power brakes, and on release of foot pedal 16, the fluid pressure in control chamber 139 is reduced approaching zero, permitting valve control piston 137 to gradually return to the right, relatively to power rod 146, until it reaches its initial position shown in Fig. 2. At the same time, with high pressure in chamber 160 and opening 120 still closed, piston 121 starts moving back to the initial position shown in Fig. 2 due to the differential of pressure on opposite sides thereof.

The return movement of piston 121 is limited by the return movement of power rod 146 and diaphragm 148 to which it is joined. As a short period of time elapses before full vacuum is again established in chamber 144 diaphragm 148 tends to lag in returning to its inoperative position, as shown in Fig. 2, even though under expansive action of spring 149. This lag would be transmitted to piston 121 delaying its return for effecting complete brake release.

However, it is seen by the initial pressure differential between chambers 139 and 160 that, on release of pedal 16, piston 121 is assisted in its return. Furthermore, ball chain 155' limits the return movement of valve 155 guaranteeing the quick opening of passage 120 of piston 121. Opening of passage 120 immediately effects complete brake release with fluid under pressure in chamber 160 free to escape. Thus brake release is prompt which is a great advantage over power brakes of different construction wherein means are not provided for assisting in the brake release function.

Power chamber 110 is advantageously secured or formed integrally with control valve 124—125 to provide a compact unit which may be positioned anywhere on the vehicle or truck frame. However, it is contemplated that said power chamber could be remote from the control valve with a suitable linkage interconnecting the diaphragm and the valve actuating power rod 146.

On the other hand it is also contemplated that valve actuating rod 146 could be forcefully actuated by any other suitable power source acting through a suitable linkage.

It will be understood that while the power chamber 110 is shown in Fig. 2 with a flexible movable diaphragm therein, it is contemplated that said power chamber could be constructed with a reciprocable piston therein. Creation of pressure differentials on opposite sides of the piston would be effected exactly as described with respect to Fig. 2.

Figure 3:
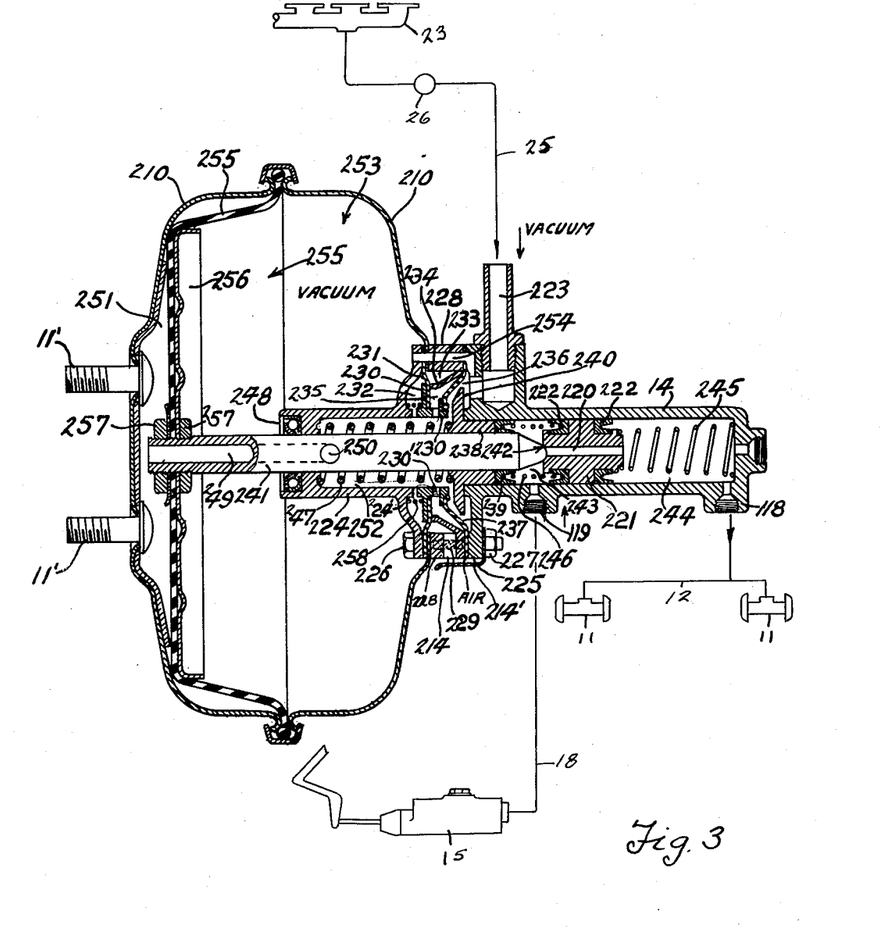
Fig. 3 is a still different embodiment of the same.

Referring to Fig. 3 the vehicle brake hydraulic cylinder 14 has an outlet port 118 for communication with hydraulic brake lines 12 shown in Fig. 1.

Intake port 119 connects with conduit 18 from the hydraulic master cylinder 15 whereby manually operated brake fluid is supplied under pressure to hydraulic cylinder 14 to be directed through the longitudinal opening 220 within piston 221 slidingly provisioned in cylinder 14. Piston expansion cups 222 carried by piston 221 at opposite ends thereof provide an effective hydraulic seal within cylinder 14.

Hydraulic cylinder 14 is provisioned at one end with a vacuum inlet connection 223 adapted for connection to vacuum conduit 25 from the vehicle intake manifold 23 in the manner illustrated in Fig. 1.

The vacuum valve body housing 224 extending within power chamber housing 210 is suitably secured to the annular flange 225 of cylinder housing 14 by bolts 226 and nuts 227, with the air filter spacer 228 interposed therebetween. Said filter spacer 228 is transversely slotted for housing air filters 229 through which air is conducted from air inlet 214'' and baffle 214' shown best in Fig. 1.

It will be noted that power chamber 210 is retained between valve housing 224 and filter spacer 228; and further that diaphragm plate 230 is provisioned within housing 224 and filter spacer 228.

Hollow diaphragm 231 retained at its outer peripheral edge between power chamber 210 and valve housing 224 is centrally secured to the annularly flanged portion of plate 230 and movable therewith. Thus chambers 232 and 233 are provided upon opposite sides thereof, with chamber 232 bounded by diaphragm 231 and housing 244, and with chamber 233 bounded by said diaphragm and the annular flanged member 234 forming a part of filter spacer 228 and projecting angularly inwardly with respect thereto.

Chambers 235 and 236 are also provided on opposite sides of the hollow secondary diaphragm 237 which is peripherally retained between filter spacer 228 and cylinder housing 14 and centrally retained by diaphragm plate 230. Diaphragm plate 230 is of the spool type construction, one end of which being secured to diaphragm 231 and the other end of same to diaphragm 237. Central radial openings 230' are provided in plate 230 between said diaphragms providing connection between chamber 235 and chamber 252.

Hollow secondary piston 238 with suitable piston cup 239 is reciprocably movable within cylinder housing 14 with its annular flanged portion 240 projecting within chamber 236 above described.

Hollow housing 224 with chambered recess 252, has longitudinally and reciprocably provisioned therein plunger 241 which projects through housing 224 and into power chamber 210 at one end, with its other end being slidably disposed through hollow piston 238, but with its rounded end portion 242 adapted to operatively register with opening 220 in piston 221 for closing off the same from chamber 243. The end portion 242 of plunger 241 is also adapted to operatively engage piston 221 for causing longitudinal translation thereof for exerting pressure upon the brake fluid contained within chamber 244 in power cylinder 14.

It will be noted that a return spring 245 is provisioned within chamber 244 of cylinder 14 between the outer end thereof and the reciprocable piston 221. Also an expansion spring 246 is interposed between piston 221 and piston 238 for maintaining a variable spaced relation therebetween, and also for holding seal 239 in position relative to piston 238. Also another return spring 247 is provisioned within valve housing 224 interposed between one end thereof and the end of piston 238. It will be noted that a suitable pneumatic seal 248 is provisioned around plunger 241 and within the end of housing 224 for maintaining a suitable seal between the plunger 241 and said housing.

Plunger 241 has a central longitudinal opening 249 in one end thereof which terminates in transverse opening 250 within plunger 241 providing pneumatic communication between chamber 251 within power chamber 210 and chamber 252 within valve housing 224.

It is seen in Fig. 3 that chamber 252 is adapted for communication with chambers 232, 235 and 236; and also with chamber 233 when diaphragm plate 230 is moved to the left relative to the annular flange 234 on spacer 228. It is further seen that vacuum communication to inlet connection 223 is established to chamber 236; and also to chamber 253 through conduit 254 formed within housing members 14 and 224 and filter spacer 228.

Flexible cup shaped diaphragm 255 peripherally retained by and between the two opposed power chamber housing members 210 is adapted to flexing movement within chambers 251 and 253 on opposite sides thereof within power chamber 210.

Diaphragm plate 256 substantially circular in shape, registering with the central inner surface of diaphragm 255, is provisioned upon the end of the reciprocable plunger 241 and secured thereon by the nuts 257 threaded upon opposite sides thereof on plunger 241. Consequently longitudinal movement of diaphragm 255 within power chamber 210, upon the establishment of a pressure differential between chambers 253 and 251, will cause a corresponding longitudinal forceful movement of plunger 241 within valve housing 224 and cylinder 14.

Operation

In operation, manual application of the vehicle foot pedal 16 shown in Fig. 1, joining the master hydraulic cylinder 15 will supply brake fluid under pressure through conduit 18 and port 119 to the hydraulic cylinder 14. Fluid under pressure thus enters chamber 243 between pistons 221 and 238 and is retained therein until sufficient pressure is developed to cause partial longitudinal movement of piston 221 to the right relative to plunger 241 and against spring 245, uncovering channel 220 therein.

Fluid under pressure thus enters chamber 244 and is directed out port 118 and through conduits 12 for initial normal vehicle brake application. Before brake application vacuum communication from the engine manifold 23, Fig. 3, has been established within chamber 253 through conduit 25, connection 223 and conduit 254. Likewise vacuum communication in chamber 251 was also obtained from connection 223, chamber 236, chamber 252, opening 250 and conduit 249, whereby an equilibrium is established between chambers 251 and 253. Furthermore vacuum communication is established with chambers 232 and 235 normally in communication with chamber 252.

The initial manually controlled fluid under pressure in chamber 243 also causes movement to the left of piston 238 within cylinder housing 14 and with respect to plunger 241. Piston or vacuum valve 238 engages diaphragm or vacuum valve seat 237 and its retaining plate 230 closing off further vacuum communication between chambers 236 and 252, and consequently from diaphragm chamber 251 within power chamber housing 210.

Further movement to the left of piston 238 causes further translation to the left of diaphragm supporting plate 230 and the diaphragm 231 also joined thereto. This movement establishes communication between chambers 233 and 235 supplying air from air inlet 214'' into valve chamber 252, whence it rapidly enters chamber 251 through opening 250 and conduit 249 in valve plunger 241.

This secondary movement of diaphragm plate 230 against the action of coiled spring 258 and up to the annular boss 224' in housing 224 is facilitated by the pressure differential between chambers 232 and 235, with vacuum initially in chamber 232 and with air now in chamber 235. Thus boss 224' definitely limits the movement to the left of piston 238.

At this point a very substantial pressure differential has been effected between chambers 253 and 251, inasmuch as chamber 253 is in constant communication with the vacuum source, while air communication has been established with chamber 251. Consequently diaphragm 255, plate 256 and plunger 241 are forcefully projected to the right, opposite to the direction of movement of piston 238.

The end portion 242 of plunger 241 closing off conduit 220 in piston 221 operatively engages the end of said piston causing longitudinal movement to the right thereof greatly increasing the fluid pressure within chamber 244 which is directed out through port 118 and through conduits 12 to the vehicle brakes. In this manner supplemental power braking of the vehicle is effected.

Movement of piston 221 to the right increasing the volume of chamber 243, necessarily reduces the existing fluid pressure therein, with the result that piston 238 can now, under action of return spring 247, return to the right holding the valve in balance; that is, holding vacuum valve 237 closed and closing air valve 231 for partial or controlled braking; or on further movement of piston 238 on brake release again establishing vacuum communication between chambers 236 and 252 and between chamber 252 and chamber 235; also permitting vacuum to be built up again within chamber 251. It will be understood as an equilibrium is again established between chambers 251 and 253 that plunger 241 and diaphragm 255 joined thereto will return to the left to its initial position for terminating or releasing the power brake action.

With vacuum in chamber 236 and air in chamber 235 the pressure differential on vacuum valve diaphragm 237 facilitates longitudinal movement of diaphragm plate 230 to the right. Air valve diaphragm 231 also moving with diaphragm plate 230 engages air valve seat 234 i. e. the annular flange 234 forming a part of member 228 thus closing off further air communication between chambers 233 and 235.

Flange 234 on spacer 228 also stops movement of plate 230 to the right thus preventing diaphragm 237 from following piston 238 thus braking valve sealing between valve 238 and diaphragm seat 237, and permitting vacuum from chamber 236 to enter chamber 232. This movement to the right of diaphragm supporting plate 230 is facilitated by the action of the initially compressed spring 258. The above pressure differential in chambers 235 and 236 on diaphragm 237 also reacts upon piston 238 in a variable degree in addition to the more or less steady or non-variable pressure exerted by spring 247. This pressure differential will be in proportion to the pressure differential on diaphragm 255 in chambers 251 and 253.

Thus a resistance pressure is created in chamber 243 against the manually created pressure from the master cylinder conduit 18, which is transferred to foot pedal 16 in proportion to the amount of braking pressure exerted by diaphragm 255, thus establishing a relationship between amount of braking and "pedal feel."

Piston 238 is now in its initial position as shown in Fig. 3, and with plunger 241 returned to its initial position, piston 221 under action of coiled spring 244 is also permitted to return to its initial brake release position. It is noted that the outer portion of piston flange 240 provides reinforcement for the flexing movement of the vacuum valve diaphragm 237.

The above construction particularly specified in Fig. 3 provides effective power braking to supplement the normal vehicle manually operated hydraulic brakes. Said structure provides for an air operated diaphragm within a power chamber for obtaining a power stroke upon the piston within the brake operating hydraulic cylinder.

It is seen that the power stroke is effected by longitudinal movement of plunger 241 operatively and directly engaging the co-axial piston 221 within the hydraulic brake operating cylinder. The particular construction shown is compact in its arrangement inasmuch as the power plunger 241 slidably operates within and through the air and vacuum control valve housing.

It is further to be noted that the vacuum valve operating control piston is reciprocably movable within said control valve housing and also within the hydraulic brake cylinder. Furthermore power plunger 241 is centrally and slidably disposed through control piston 233, with its movement being entirely independent of the movement of said control piston. In fact on power brake application, movements of the plunger and the valve piston are in opposite directions.

Having described my invention, reference should now be had to the claims which follow for determining the scope thereof.

I claim:

1. The combination, an air and vacuum valve housing, a power chamber joined thereto, a movable member within said power chamber defining operating and vacuum chambers on opposite sides thereof, a vacuum source joining said housing and conducted therethrough to said vacuum chamber, air inlet ports in said housing, a plunger rod secured to said movable member and slidably disposed through said valve housing, said rod having a partial longitudinal passage terminating in said operating chamber and within said housing, and movable means in said housing for alternately providing air and vacuum communication to said operating chamber.

2. The combination, an air and vacuum valve housing, a power chamber joined thereto, a movable member within said power chamber defining operating and vacuum chambers on opposite sides thereof, a vacuum source joining said housing and conducted therethrough to said vacuum chamber, air inlet ports in said housing, movable means secured to said movable member and slidably disposed through said valve housing, said movable means having a partial longitudinal passage terminating in said operating chamber and within said housing, movable valve means in said housing for alternately providing air and vacuum communication to said operating chamber, and manually actuated means engageable with the movable valve means in said valve housing.

3. The combination, an air and vacuum valve housing, a power chamber joined thereto, a movable member within said power chamber defining operating and vacuum chambers on opposite sides thereof, a vacuum source joining said housing and conducted therethrough to said vacuum chamber, air inlet ports in said housing, movable means secured to said movable member and slidably disposed through said valve housing, said movable means having a partial longitudinal passage terminating in said operating chamber and within said housing, movable valve means in said housing for alternately providing air and vacuum communication to said operating chamber, a hydraulic cylinder joined to said housing, and a manually actuated piston movable in said cylinder and engageable with said valve means.

4. In combination, an air and vacuum valve housing, a power chamber joined thereto on one side thereof, a movable diaphragm within said chamber defining operating and vacuum chambers on opposite sides thereof, a vacuum source joined to said housing and conducted therethrough to said vacuum and operating chambers, air inlet ports in said housing, a power rod secured to said diaphragm and slidably disposed through said housing, said rod having a partial longitudinal passage terminating in said operating chamber and within said housing, a movable diaphragm provided within said housing and carrying a normally seated air valve, a hydraulic cylinder joined to said housing upon its other side, and a movable valve piston therein normally in spaced relation to said valve diaphragm to permit vacuum communication to said operating chamber, but adapted on movement thereof to close off said vacuum communication, and on further movement unseat said air valve to establish air communication to said operating chamber.

5. The combination, an air and vacuum valve housing, a vacuum source joined thereto, air inlet ports in said housing, a pressure differential motor including a movable member defining a vacuum chamber and an operating chamber, a longitudinally reciprocal power rod actuated thereby and slidably disposed through said valve housing, said rod having a partial longitudinal passage terminating in said operating chamber and within said housing, and movable means in said housing for providing air and vacuum communication to said motor.

6. The combination, an air and vacuum valve housing, a vacuum source joined thereto, air inlet ports in said housing, a pressure differential motor including a movable member defining a vacuum chamber and an operating chamber, a longitudinally reciprocal power rod actuated thereby and slidably disposed through said valve housing said rod having a partial longitudinal passage terminating in said operating chamber and within said housing, movable means in said housing for providing air and vacuum communication to said motor, and manually actuated means engageable with said movable means.

7. The combination, an air and vacuum valve housing, a vacuum source joined thereto, air inlet ports in said housing, a pressure differential motor including a movable member defining a vacuum chamber and an operating chamber, a longitudinally reciprocal power rod actuated thereby and slidably disposed through said valve housing said rod having a partial longitudinal passage terminating in said operating chamber and within said housing, and movable diaphragm means in said housing for providing air and vacuum communication to said motor.

8. The combination, an air and vacuum valve housing, a vacuum source joined thereto, air inlet ports in said housing, a pressure differential motor including a movable member defining a vacuum chamber and an operating chamber, a longitudinally reciprocal power rod actuated thereby and slidably disposed through said valve housing said rod having a partial longitudinal passage terminating in said operating chamber and within said housing, a movable diaphragm in said housing for regulating air and vacuum communication to said motor, an air valve seat in said housing, an air valve joined to said diaphragm, and manually actuated vacuum control means engageable with said diaphragm, and adapted to effect movement thereof.

GORDON R. ELLIOTT.

REFERENCES CITED

The following references are of record in the file of this patent:

UNITED STATES PATENTS

| Number | Name | Date |
|---|---|---|
| 1,548,232 | Westbrook | Aug. 4, 1925 |
| 1,766,481 | Bragg | June 24, 1930 |
| 2,308,460 | Stelzer | Jan. 12, 1943 |
| 2,336,374 | Stelzer | Dec. 7, 1943 |
| 2,372,014 | Rockwell | Mar. 30, 1945 |
| 2,388,220 | Rockwell | Oct. 30, 1945 |
| 2,393,524 | Fant | Jan. 22, 1946 |
| 2,398,252 | Rockwell | Apr. 9, 1946 |

FOREIGN PATENTS

| Number | Country | Date |
|---|---|---|
| 290,980 | Great Britain | Dec. 20, 1928 |